United States Patent
Hazzani (10) Patent No.: US 9,386,282 B2
(45) Date of Patent: *Jul. 5, 2016

(54) SYSTEM AND METHOD FOR AUTOMATIC CAMERA HAND-OFF USING LOCATION MEASUREMENTS

(75) Inventor: Gideon Hazzani, Rishon Le Zion (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 916 days.

This patent is subject to a terminal disclaimer.

(21) Appl. No.: 12/887,089

(22) Filed: Sep. 21, 2010

(65) Prior Publication Data

US 2011/0069173 A1 Mar. 24, 2011

(30) Foreign Application Priority Data

Sep. 23, 2009 (IL) .......................................... 201129

(51) Int. Cl.
*H04N 7/18* (2006.01)
*G08B 13/196* (2006.01)
*G08B 13/24* (2006.01)
*H04N 21/218* (2011.01)
*H04L 29/08* (2006.01)
*H04W 4/02* (2009.01)

(52) U.S. Cl.
CPC .......... *H04N 7/181* (2013.01); *G08B 13/19608* (2013.01); *G08B 13/19645* (2013.01); *G08B 13/19658* (2013.01); *G08B 13/2462* (2013.01); *H04L 67/18* (2013.01); *H04N 21/21805* (2013.01); *H04W 4/02* (2013.01)

(58) Field of Classification Search
CPC .. H04N 7/181; H04N 21/21805; H04L 67/18; G08B 13/19645; G08B 13/2462; G08B 13/19658; G08B 13/19608; H04W 4/02

USPC .......................................................... 348/159
See application file for complete search history.

(56) References Cited

U.S. PATENT DOCUMENTS 4,930,888 A * 6/1990 Freisleben ........... G02B 27/017 340/980
8,253,797 B1 * 8/2012 Maali .................... G06T 7/0042 345/419

(Continued)

FOREIGN PATENT DOCUMENTS

DE 202008007520 U1 8/2008
WO 2010116292 A2 10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.

(Continued)

*Primary Examiner* — Jay Patel
*Assistant Examiner* — Joseph Suh
(74) *Attorney, Agent, or Firm* — Meunier Carlin & Curfman (57) ABSTRACT

Systems and methods for receiving video images from a plurality of video cameras having respective fields of view that cover a geographical region. At a first time, first video images of an object may be output, where the images are captured by a first video camera selected from the plurality of video cameras. Location indications may be received, which specify a geographical location of the object in the geographical region and which are determined independently of the video images. At a second time subsequent to the first time, a second video camera from the plurality may be selected based on the location indications. The output may be switched to the second video images of the object, which are captured by the selected second video camera.

8 Claims, 4 Drawing Sheets

(56) References Cited

U.S. PATENT DOCUMENTS

| | | | |
|---|---|---|---|
| 2003/0063133 A1* | 4/2003 | Foote | G06F 3/04815 |
| | | | 715/850 |
| 2003/0203730 A1 | 10/2003 | Wan et al. | |
| 2004/0105006 A1 | 6/2004 | Lazo et al. | |
| 2004/0164858 A1* | 8/2004 | Lin | G08B 13/19608 |
| | | | 340/522 |
| 2004/0169587 A1 | 9/2004 | Washington | |
| 2004/0257444 A1* | 12/2004 | Maruya | G08B 13/19645 |
| | | | 348/169 |
| 2006/0107296 A1* | 5/2006 | Mock | G08B 13/19608 |
| | | | 725/105 |
| 2008/0114612 A1* | 5/2008 | Needham et al. | 705/1 |
| 2009/0033519 A1* | 2/2009 | Shi et al. | 340/995.19 |
| 2009/0059007 A1* | 3/2009 | Wagg | G06K 9/00369 |
| | | | 348/157 |
| 2010/0329546 A1* | 12/2010 | Smith | 382/164 |
| 2011/0069172 A1* | 3/2011 | Hazzani | G08B 13/19645 |
| | | | 348/159 |

OTHER PUBLICATIONS

ETSI TS 102 657 v1.4.1, "Lawful Interception (LI); Retained data handling; Handover interface for the request and delivery of retained data," Dec. 2009, 92 pages.

Girardin, Fabien, et al., "Detecting air travel to survey passengers on a worldwide scale," Journal of Location Based Services, 26 pages.

Strobel, Daehyun, "IMSI Catcher," Seminararbeit Ruhr-Universität Bochum, Chair for Communication Security, Prof. Dr.-Ing. Christof Paar, Jul. 13, 2007, 28 pages.

Meyer, Ulrike, et al., "On the Impact of GSM Encryption and Man-in-the-Middle Attacks on the Security of Interoperating GSM/UMTS Networks," IEEE, 2004, 8 pages.

Vedaldi, Andrea, "An implementation of SIFT detector and descriptor," University of California at Los Angeles, 7 pages.

Extended European Search Report, dated Dec. 22, 2010 in connection with Application No. EP10178200.

\* cited by examiner

SYSTEM AND METHOD FOR AUTOMATIC CAMERA HAND-OFF USING LOCATION MEASUREMENTS

FIELD OF THE DISCLOSURE

The present disclosure relates generally to video surveillance, and particularly to methods and systems for performing hand-off between video cameras.

BACKGROUND OF THE DISCLOSURE

Video surveillance systems are deployed and operated in various applications, such as airport security, crime prevention and access control. In a typical video surveillance application, multiple video cameras acquire video footage, which is viewed and/or recorded at a monitoring center.

Mobile communication networks deploy various techniques for measuring the geographical locations of wireless communication terminals. Such techniques are used, for example, for providing Location Based Services (LBS) and emergency services in cellular networks. Some location tracking techniques are based on passive probing of network events generated by the wireless terminals. Other techniques are active, i.e., proactively request the network or the terminal to provide location information.

SUMMARY OF THE DISCLOSURE

An embodiment that is described herein provides a method, including:

receiving video images from a plurality of video cameras having respective fields of view that cover a geographical region;

at a first time, outputting first video images of an object, which are captured by a first video camera selected from the plurality;

receiving location indications, which specify a geographical location of the object in the geographical region and which are determined independently of the video images;

at a second time subsequent to the first time, selecting based on the location indications a second video camera from the plurality, different from the first video camera; and switching to output second video images of the object, which are captured by the selected second video camera.

In some embodiments, the object includes an individual moving through the geographical region. Additionally or alternatively, the object is associated with a wireless communication terminal that communicates with a communication network, and receiving the location indications includes receiving location measurements of the wireless communication terminal from the communication network. In some embodiments, selection of the second video camera is performed by a switch in the communication network. In a disclosed embodiment, outputting the first and second video images includes displaying the first and second video images to an operator.

In an embodiment, selecting the second video camera includes querying a predefined mapping of geographical locations to image locations in the fields of views of the video cameras. In another embodiment, selecting the second video camera includes calculating, based on the location indications, respective first and second image locations of the object in first and second fields of view of the first and second video cameras, and selecting the second camera based on the first and second image locations. In yet another embodiment, selecting the second video camera further includes controlling the second video camera so as to modify a respective field of view of the second video camera responsively to the location indications.

There is additionally provided, in accordance with an embodiment that is described herein, a system, including:

a first interface, which is configured to receive video images from a plurality of video cameras having respective fields of view that cover a geographical region;

a second interface, which is configured to receive location indications, which specify a geographical location of an object in the geographical region and which are determined independently of the video images; and a processor, which is configured to output, at a first time, first video images of the object, which are captured by a first video camera selected from the plurality, to select from the plurality based on the location indications, at a second time subsequent to the first time, a second video camera different from the first video camera, and to switch to output second video images of the object, which are captured by the selected second video camera.

The present disclosure will be more fully understood from the following detailed description of the embodiments thereof, taken together with the drawings in which:

DETAILED DESCRIPTION OF EMBODIMENTS

Overview

Video surveillance systems typically collect video images from multiple video cameras and present the images to an operator. The operator may observe objects (e.g., individuals) of interest in the images and take appropriate actions. In a typical video surveillance system, each camera has a limited field-of-view, and the multiple cameras collectively cover a certain region of interest.

In many practical scenarios, an individual of interest is in motion, and in particular moves in and out of the fields-of-view of different cameras. The operator, on the other hand, is concerned with tracking the individual in question as seamlessly as possible. Tracking an individual in motion therefore requires hand-off between cameras, i.e., modifying the selection of the camera whose video is presented to the operator in an attempt to track the individual of interest without interruption.

Embodiments that are described hereinbelow provide improved methods and systems for automatic hand-off between video cameras. In some embodiments, a correlation processor receives location indications, which indicate the geographical location of the individual of interest. The correlation processor decides when to perform camera hand-off, and to which camera, based on the estimated location of the individual as reflected by the location indications.

The location indications used for triggering camera hand-off are determined independently of the video images, i.e., do not rely on image processing in any way. For example, the individual may carry a cellular phone or other wireless terminal, which communicates with a cellular network that also measures the terminal's location. Location measurements of the terminal, provided by the cellular network, may serve as location indications of the terminal's user for the purpose of camera hand-off.

Since the disclosed techniques use location indications that are independent of the video images, they are able to perform camera hand-off reliably under difficult visual conditions, e.g., when the camera's field-of-view is obstructed, when video quality is poor or when the fields-of-view of neighboring cameras do not overlap.

The embodiments described herein mainly address video surveillance of individuals that carry wireless communication terminals, and performing camera hand-off based on location measurements of the terminals. Nevertheless, the methods and systems described herein can also be used with various other types of tracked objects and location indications, such as in tracking objects that are fitted with Radio Frequency Identification (RFID) tags, or Automatic Vehicle Location (AVL) or Automatic Person Location (APL) transponders.

System Description

Figure 1:
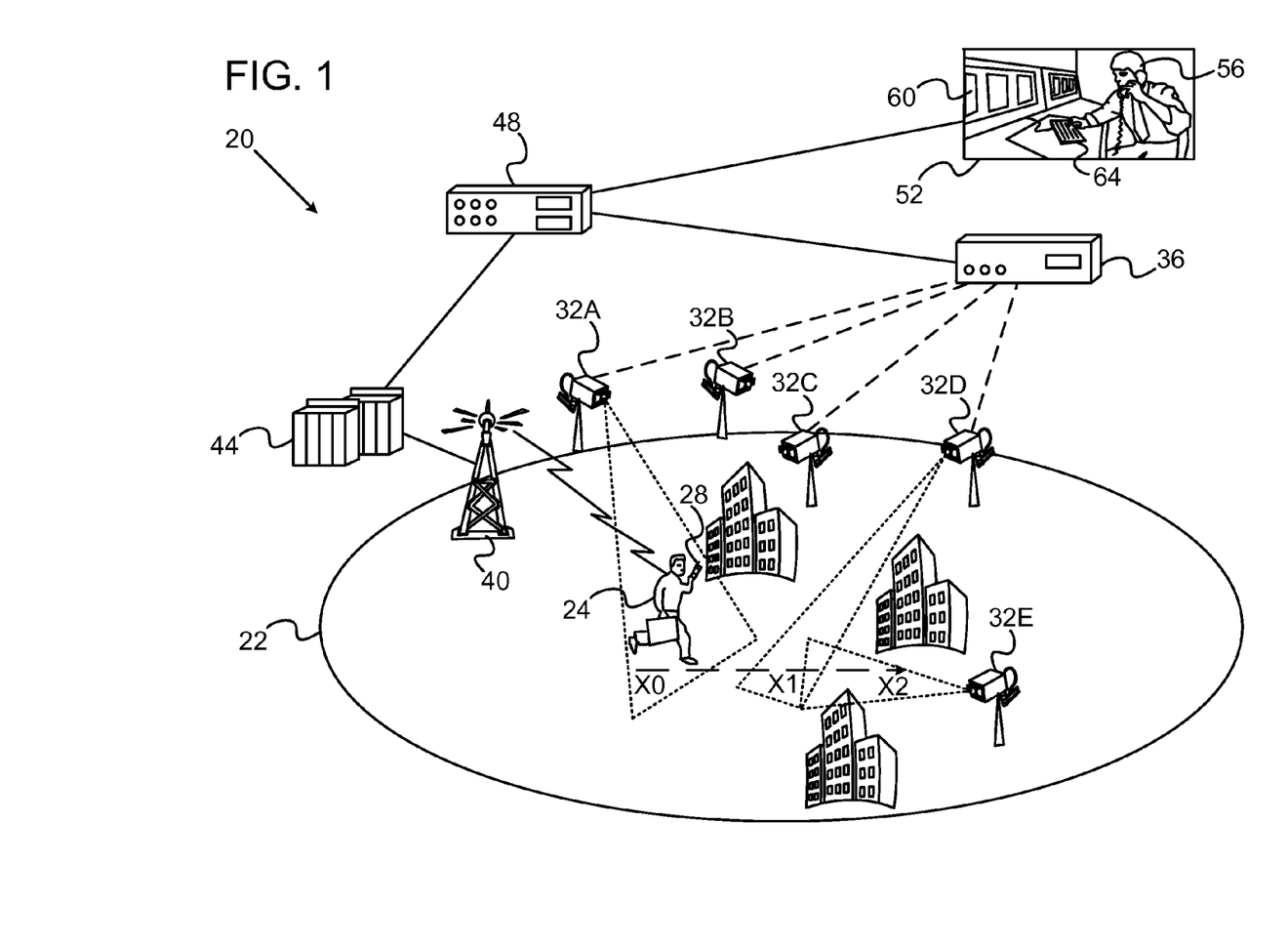
FIG. 1 is a pictorial, schematic illustration of a video surveillance system, in accordance with an embodiment of the present disclosure.

FIG. 1 is a pictorial, schematic illustration of a video surveillance system 20, in accordance with an embodiment that is described herein. System 20 tracks individuals of interest within a certain geographical region 22, which may comprise a city, city center, neighborhood, airport terminal or any other suitable area. Systems of this sort may be operated, for example, by law enforcement or other Government agencies, such as in airport security systems, crime prevention systems or anti-terrorism systems.

System 20 tracks individuals 24 using a video subsystem 36, which comprises multiple video cameras. In the present example, subsystem 36 comprises five video cameras 32A . . . 32E, although any other number of cameras may be used. Each camera has a certain field-of-view, which covers a particular sector in area 22. The cameras capture video images of their respective sectors and send the images to subsystem 36. The cameras may have fixed fields-of-view, or they may comprise cameras whose fields-of-view are adjustable such as Pan-Tilt-Zoom (PTZ) cameras.

At least some of individuals 24 communicate with a mobile communication network 40 by operating wireless communication terminals 28. (Individuals 24 are therefore sometimes referred to herein as users. The two terms are used interchangeably.) Terminals 28 may comprise, for example, cellular phones, wireless-enabled computers or Personal Digital Assistants (PDAs), or any other suitable communication or computing device having wireless communication capabilities. Communication network 40 and terminals 28 may conform to any suitable communication standard or protocol, such as Long Term Evolution (LTE), Universal Mobile Telecommunication System (UMTS), CDMA2000 or other third generation (3G) cellular standard, Global System for Mobile communication (GSM) or Integrated Digital Enhanced Network (IDEN). Alternatively, the network and terminals may conform to the IEEE 802.16 (WiMAX) standards or other wireless data standard. Although FIG. 1 shows only a single user for the sake of clarity, practical networks typically communicate with a large number of users and terminals. Although the description that follows refers to a single network, system 20 may operate with any desired number of communication networks, which may conform to different standards or protocols.

System 20 comprises a location tracking subsystem 44, which measures the geographical locations of wireless communication terminals 28 in area 22. The example of FIG. 1 refers to a single location tracking subsystem.

Alternatively, the system may comprise two or more location tracking subsystems, which may be of different types. Location tracking subsystem 44 may apply any suitable location tracking technique available in the network, or a combination of such techniques, in order to measure terminal locations.

Some location tracking techniques, referred to as network-based techniques, are carried out by base stations and other network-side components of the network, without necessarily using special hardware or software in terminals 28. Other location tracking techniques are terminal-based, i.e., use special hardware or software in wireless terminals 28. Terminal-based techniques may comprise, for example, techniques that use Global Navigation Satellite Systems (GNSS) such as GPS or GALILEO. The location tracking techniques may be passive or active. Passive techniques perform unobtrusive probing of the signaling information transmitted in the network, and extract location information from the monitored signaling. Active techniques, on the other hand, proactively request the network or the terminal to provide location information.

Some examples of location tracking techniques that can be used for this purpose are described in U.S. patent application Ser. No. 12/497,799, filed Jul. 6, 2009, which is assigned to the assignee of the present patent application and whose disclosure is incorporated herein by reference. Location tracking subsystem 44 thus measures the geographical locations of at least some of terminals 28, and produces location indications that indicate the measured terminal locations.

System 20 comprises a correlation system 48, which interacts with location tracking subsystem 44 and video subsystem 36. For a given individual 24, correlation system 48 selects the appropriate video camera for tracking this individual based on the location indications of terminal 28 operated by this individual, as provided by subsystem 44. In particular, the correlation system uses the location indications to decide when to perform camera hand-off (i.e., switch to a different camera), and to which camera. In a typical implementation, correlation system 48 notifies video subsystem 36 of the estimated geographical location of the individual, and the video subsystem selects the camera that is best suited for viewing this location. Alternatively, the camera selection may be carried out by the correlation system itself.

The video from the selected video camera is provided from video subsystem 36 via correlation system 48 to a monitoring center 52. The video is typically displayed to an operator 56 using an output device such as a display 60. In the example of FIG. 1, operator 56 is presented with real-time video images showing user 24 and his or her vicinity. Operator 56 may control the display or provide other input using an input device 64, such as a keyboard or mouse. Additionally or alternatively to presenting the video to operator 56, correlation system 48 or monitoring center 52 may store the video for later retrieval and analysis.

Figure 2:
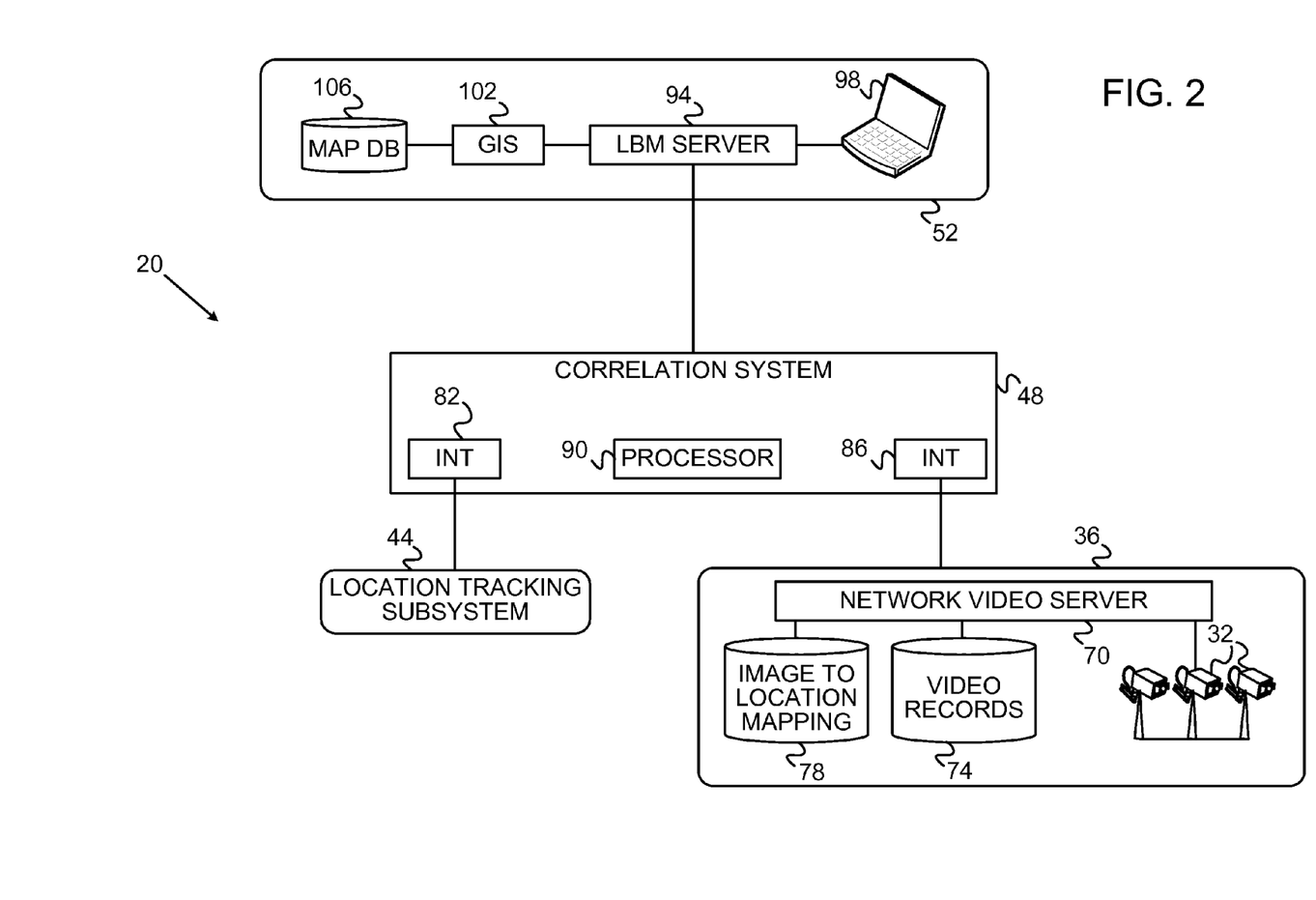
FIG. 2 is a block diagram that schematically illustrates a video surveillance system, in accordance with an embodiment of the present disclosure.

FIG. 2 is a block diagram that schematically illustrates components of system 20, in accordance with an embodiment that is described herein. Video subsystem 36 comprises a networked video server 70, which manages the operation of cameras 32, receives the video images captured by the cameras and sends the video to correlation system 48. Video server 70 stores captured video in a video records database 74 for off-line viewing and analysis. Subsystem 36 also comprises an image-to-location mapping database 78. Database 78 stores a predefined mapping of image coordinates to geographical coordinates for each camera 36. By querying this database with a certain geographical location, server 70 can determine which of cameras 32 has a field-of-view that covers this geographical location.

Correlation system 48 comprises interfaces 82 and 86 for communicating with location tracking subsystem 44 and video subsystem 36, respectively. System 48 further comprises a correlation processor 90, which carries out the correlation functions described herein.

Monitoring center 52 comprises a Location-Based Monitoring (LBM) server 94, which accepts the video from the selected camera (or cameras) from correlation system and presents it to operator 56 using an operator terminal 98. In the example of FIG. 2, LBM server 94 and correlation system 48 interact directly. In alternative embodiments, however, system 48 and server 94 may interact via a database that stores the selected video (e.g., database 74 or a separate database). In some embodiments, server 94 interacts with a Geographic Information System (GIS) 102, which provides map information and other geographic data for presentation purposes. The GIS may hold any suitable kind of geographic information, such as Points of Interest (POIs), clutter data and blueprints of area 22. The geographic information is stored in a map database 106.

The configurations of FIGS. 1 and 2 are example configurations, which were selected purely for the sake of conceptual clarity. In alternative embodiments, any other suitable system configuration can also be used. For example, correlation system 48 and monitoring center 56 may be collocated, and the functions of processor 90 can be integrated into server 94. In some embodiments, some functions of correlation system 52 may be implemented as part of a switch, such as a Mobile Switching Center (MSC), of communication network 40.

The different databases in system 20 (e.g., databases 74, 78 and 106) may be implemented using any suitable data structures and storage devices. Typically, processor 90 and server 94 comprise general-purpose computers, which are programmed in software to carry out the functions described herein. The software may be downloaded to the computers in electronic form, over a network, for example, or it may, alternatively or additionally, be provided and/or stored on tangible media, such as magnetic, optical, or electronic memory.

Automatic Camera Hand-Off Process

FIG. 1 above shows an example scenario, in which user 24 moves through area 22 between three locations denoted X0, X1 and X2. When the user is at location X0 he is best viewed by camera 32A, when the user is at location X1 he is best viewed by camera 32D, and when the user is at location X2 he is best viewed by camera 32E. In this example, video surveillance of this user should begin with camera 32A, then hand-off to camera 32D, and finally hand-off to camera 32E. Note that some locations along the user's path are obstructed from view by buildings and cannot be viewed by any of the cameras.

As user 24 moves through area 22, location tracking subsystem 44 measures the geographical location of terminal 28 and sends location indications to correlation system 48. Note that the user need not necessarily operate the terminal, e.g., conduct calls. It is usually sufficient that the terminal is switched on. Correlation system 48 sends the estimated geographical location of the user to video subsystem 36. Based on the user's estimated location, and on the known fields-of-view of the different cameras, server 70 decides which camera is best suited for viewing the user.

Typically, server 70 queries database 78 with the user's estimated geographical location, so as to determine one or more cameras whose field-of-view currently covers the user. If the user appears in the fields-of-view of multiple cameras, server 70 may apply any suitable criteria or logic to select one of the cameras. For example, server 70 may select the camera in which the user appears closest to the center of the field-of-view, or the camera that is geographically closest to the user. The video from the selected camera is sent to monitoring center 52 and presented to operator 56.

The above camera selection process is typically carried out continually, in real-time. In other words, as user 24 moves through area 22, location subsystem 44 sends up-to-date location indications to correlation system 48, and the correlation system sends up-to-date location estimates to video subsystem 36. The video subsystem updates the camera selection (i.e., performs camera hand-off) whenever needed to match the changing location estimates, and sends the video captured by the currently-selected camera.

Figure 3:
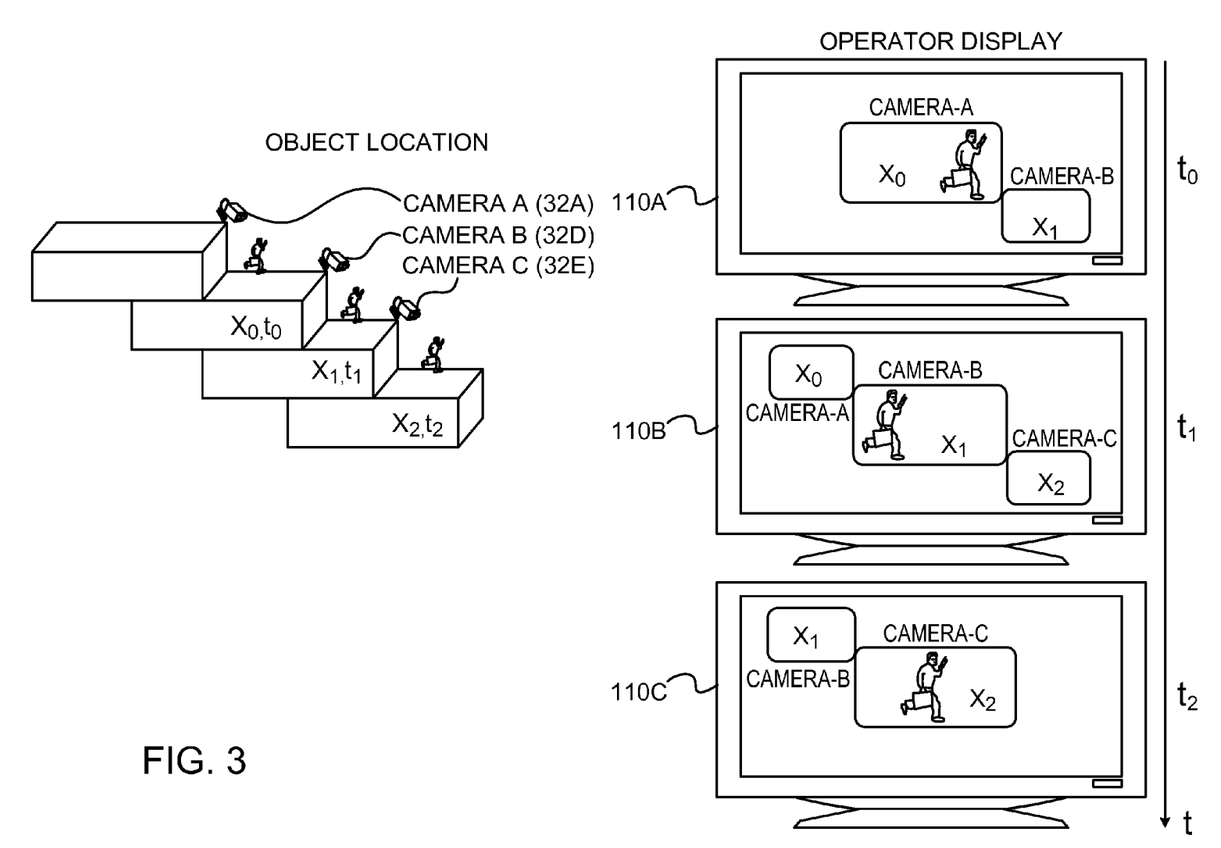
FIG. 3 is a diagram that schematically illustrates an operator display in a video surveillance system, in accordance with an embodiment of the present disclosure.

FIG. 3 is a diagram that schematically illustrates the video displayed to operator 56 in the above example scenario, in accordance with an embodiment that is described herein. The left hand side of the figure shows the cameras selected by server 70 as user 24 moves from location X0 to location X1 and then to location X2. When the user is in the vicinity of X0 around a time denoted t0, server 70 selects camera 32A (presented as "CAMERA A" to the operator). When the user moves away from X0 and approaches X1 around a time denoted t1, server 70 hands-off to camera 32D ("CAMERA B"). When the user approaches X2 around a time denoted t2, server 70 hands-off to camera 32E ("CAMERA C").

The video displayed to operator 56 in this scenario is shown on the right hand side of FIG. 3. Displays 110A . . . 110C show the video that is presented to the operator around times t0 . . . t2, respectively. Around time t0, user 24 is located in the vicinity of location X0, and therefore system 20 displays the video captured by camera A (32A) at the center of the screen. This view is shown in display 110A. In the present example, the system also displays a smaller window, showing the video of camera B (32D) to which hand-off is anticipated.

Between t0 and t1, the user moves away from X0 and approaches X1. At some point in time between t0 and t1, server 70 decides to hand-off from camera A (32A) to camera B (32D). As a result, around time t1 the system displays the video of camera B (32D) at the center of the screen, as shown in display 110B. In this example, the display also shows smaller windows with the video of camera A (32A) from which the previous hand-off was performed, and of camera C (32E) to which the next hand-off is anticipated.

Between t1 and t2, the user moves away from X1 toward X2. At a certain time between t1 and t2, server 70 decides to hand-off from camera B (32D) to camera C (32E). Therefore, around time t2 system 20 displays the video of camera C (32E) at the center of the screen, as shown in display 110C. Display 110C also shows a smaller window with the video of camera B (32D) from which the previous hand-off was performed.

As can be appreciated, the above camera hand-off process is performed by system 20 automatically without operator intervention. At any point in time, system 20 selects the video camera that best covers the current geographical location of the user, based on the location measurements performed on the user's communication terminal. As a result, the operator is automatically presented with continuous video footage of the user's location, even though the user moves in and out of the fields-of-view of different video cameras.

The user interface shown in FIG. 3 is an example user interface, which is shown purely for the sake of conceptual clarity. In alternative embodiments, any other suitable user interface can also be used to present the video from the selected camera or cameras to the operator.

Surveillance Method Description

Figure 4:
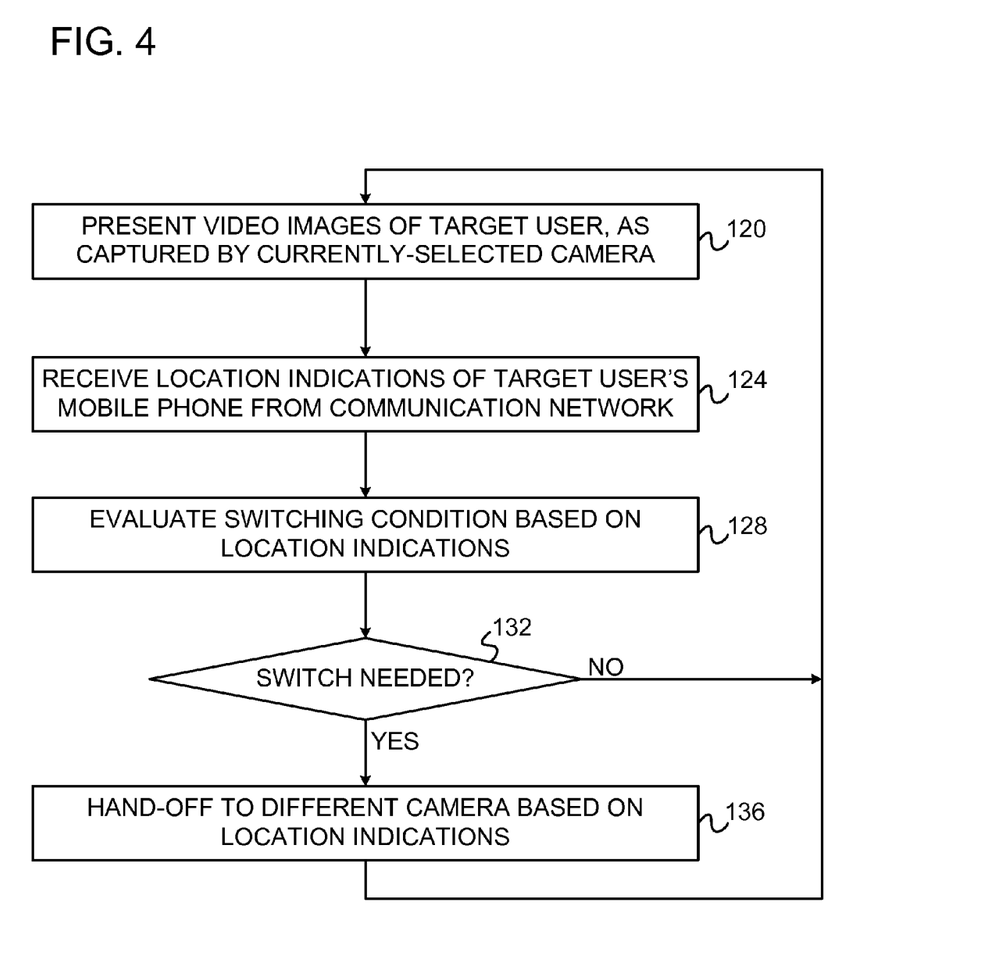
FIG. 4 is a flow chart that schematically illustrates a surveillance method, in accordance with an embodiment of the present disclosure.

FIG. 4 is a flow chart that schematically illustrates a surveillance method, in accordance with an embodiment that is described herein. The method describes the process of tracking a given user of interest, referred to as a target user, as he or she moves through area 22. The method begins with LBM server 94 displaying to operator 56 video from a certain video camera, at a video output step 120. The camera has been selected by server 70 based on location indications of the target user's communication terminal (e.g., cellular phone) provided by location tracking subsystem 44.

Correlation system 48 receives up-to-date location indications from subsystem 44, at a location updating step 124. In response to the location indications, system sends up-to-date estimates of the target user's geographical location to video server 70.

Based on the estimated user location, server 70 evaluates whether it is necessary to perform camera hand-off (i.e., switch to displaying the video of a different camera), at a switching evaluation step 128. Server 70 may apply various conditions or criteria for deciding whether to perform camera hand-off, and to which camera. In some embodiments, the criterion is defined with respect to the user's image location within the field-of-view of the currently-selected camera, and/or the user's image location within the fields-of-view of neighboring cameras. Note, however, that server 70 determines these image locations using the location indications and using database 78, i.e., irrespective of the video images themselves. Server 70 typically does not rely on image processing to determine the user's image position in the cameras' fields-of-view.

For example, server 70 may check whether the user's estimated location corresponds to the edge of the currently-selected camera's field-of-view. If the user's location is in the middle of the current camera's field-of-view, hand-off may not be necessary. Otherwise, server 70 may attempt to find a camera that better covers the user's location. In some embodiments, the decision to switch to a different camera is based only on the estimated geographical location of the user, regardless of the user's position at the camera's field-of-view. Additionally or alternatively, server 70 may apply any other suitable criterion to decide whether, and to which camera, to perform hand-off.

Server 70 checks whether hand-off is needed, at a checking step 132. If no hand-off is needed, the method loops back to step 120 above, and system 20 continues to display video from the currently-selected camera. If hand-off is needed, server 70 performs camera hand-off, at a hand-off step 136. Server 70 selects a camera whose field-of-view better covers the current user location, as explained above. The method loops back to step 120 above, and system 20 begins to display video from the newly-selected camera.

The embodiments described herein mainly refer to video surveillance of individuals based on location measurements performed on the mobile terminals they carry. Alternatively, however, the methods and systems described herein can also be used to perform video surveillance (and in particular camera hand-off) on various other types of objects. Tracking such objects may be performed using various other kinds of location indications. For example, the methods and systems described herein can be used with object fitted with Radio Frequency Identification (RFID) tags, or Automatic Vehicle Location (AVL) or Automatic Person Location (APL) transponders. In these embodiments, location measurements of an RFID tag or transponder can be used as location indications of the object.

The embodiments described herein refer mainly to automatic selection of camera, i.e., camera hand-off. Additionally, when a given camera has an adjustable field-of-view (e.g., a PTZ camera), server 70 may also adjust the selected camera's field-of-view based on the location indications, in order to best view the user.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:
1. A method, comprising:
   receiving video images in real time from a plurality of video cameras having respective fields of view that cover a geographical region;
   at a first time, outputting first video images of an object to an operator, which are captured by a first video camera selected from the plurality of video cameras;
   receiving location indications from unobtrusive passive probing of signaling information associated with a wireless communication terminal that communicates through a communication network to a destination, the location indications specifying a geographical location of the object in the geographical region and being determined independently of the video images, the object being associated with the wireless communication terminal and the unobtrusive probing not providing information to the wireless communication terminal, and the location indications including location measurements of the wireless communication terminal from the communication network;
   at a second time subsequent to the first time, selecting based on the location indications a second video camera from the plurality, different from the first video camera;
   switching to output second video images of the object, which are captured by the selected second video camera;
   storing captured video in a video records database; and
   selecting video images from one of first and second video cameras and providing these images to an operator along with map information,
   wherein selecting the second video camera comprises querying a predefined mapping of geographical locations to image locations in the fields of views of the video cameras, and wherein selecting the second video camera further comprises controlling the second video camera so as to modify a respective field of view of the second video camera responsively to the location indications.
2. The method according to claim 1, wherein the object comprises an individual moving through the geographical region.
3. The method according to claim 1, wherein selection of the second video camera is performed by a switch in the communication network.

4. The method according to claim 1, wherein selecting the second video camera comprises calculating, based on the location indications, respective first and second image locations of the object in first and second fields of view of the first and second video cameras, and selecting the second camera based on the first and second image locations.

5. A system, comprising:
a first interface, which is configured to receive video images in real time from a plurality of video cameras having respective fields of view that cover a geographical region;
a second interface, which is configured to receive location indications from unobtrusive passive probing of signaling information associated with a wireless communication terminal that communicates through a communication network to a destination, the location indications specifying a geographical location of an object in the geographical region and being determined independently of the video images, the unobtrusive probing not providing information to the wireless communication terminal, the object being associated with the wireless communication terminal, and the location indications including location measurements of the wireless communication terminal from the communication network; and
a processor, which is configured to output, at a first time, first video images of the object to an operator, which are captured by a first video camera selected from the plurality, to select from the plurality based on the location indications, at a second time subsequent to the first time, a second video camera different from the first video camera, and to switch to output second video images of the object, which are captured by the selected second video camera; and
a server, which provides video images from both first and second video cameras to an operator along with map information as well as stores captured video in a video records database
wherein selecting the second video camera comprises querying a predefined mapping of geographical locations to image locations in the fields of views of the video cameras, and wherein selecting the second video camera further comprises controlling the second video camera so as to modify a respective field of view of the second video camera responsively to the location indications.

6. The system according to claim 5, wherein the object comprises an individual moving through the geographical region.

7. The system according to claim 5, wherein the processor is comprised in a switch in the communication network.

8. The system according to claim 5, wherein the processor is configured to control the second video camera so as to modify a respective field of view of the second video camera responsively to the location indications.

* * * * *